(12) United States Patent
MacCoy

(10) Patent No.: US 8,039,722 B2
(45) Date of Patent: Oct. 18, 2011

(54) METHODS AND FORMATS FOR VISUALLY EXPRESSING MUSIC

(76) Inventor: Jason MacCoy, Bellevue, WA (US)

( * ) Notice: Subject to any disclaimer, the term of this patent is extended or adjusted under 35 U.S.C. 154(b) by 0 days.

(21) Appl. No.: 12/655,712

(22) Filed: Jan. 5, 2010

(65) Prior Publication Data

US 2010/0180752 A1    Jul. 22, 2010

Related U.S. Application Data

(60) Provisional application No. 61/204,301, filed on Jan. 5, 2009.

(51) Int. Cl.
*G09B 15/02*    (2006.01)
(52) U.S. Cl. .................................................. 84/483.2
(58) Field of Classification Search ................... 84/483.2
See application file for complete search history.

(56) References Cited

U.S. PATENT DOCUMENTS

| | | | | |
|---|---|---|---|---|
| 110,719 A * | 1/1871 | Zimmermann | | 84/483.2 |
| 438,429 A * | 10/1890 | Clemens | | 84/483.2 |
| 482,442 A * | 9/1892 | Robberson | | 84/483.2 |
| 608,771 A * | 8/1898 | Guilford | | 84/471 R |
| 682,015 A * | 9/1901 | Adams | | 84/483.2 |
| 733,351 A * | 7/1903 | Beswick | | 84/483.2 |
| 881,085 A * | 3/1908 | Shires | | 84/483.1 |
| 1,313,015 A * | 8/1919 | Reeve | | 84/483.2 |
| 1,424,718 A * | 8/1922 | Fee | | 84/483.2 |
| 1,483,380 A * | 2/1924 | Reeve | | 84/483.2 |
| 3,331,271 A * | 7/1967 | Glenn | | 84/478 |
| 3,845,685 A * | 11/1974 | Coles | | 84/451 |
| 4,054,079 A * | 10/1977 | Sohler | | 84/423 R |
| 5,574,238 A * | 11/1996 | Mencher | | 84/483.2 |
| 5,574,242 A | 11/1996 | Bui | | |
| 5,998,721 A * | 12/1999 | Lepinski | | 84/483.2 |
| 6,015,947 A * | 1/2000 | Moberg | | 84/471 R |
| 6,476,303 B1 * | 11/2002 | Mutou et al. | | 84/483.2 |

(Continued)

OTHER PUBLICATIONS

Numbered Notes © 2010, http://numberednotes.com/About/how_nn_works.php Jan. 10, 2010.*

(Continued)

*Primary Examiner* — Elvin G Enad
*Assistant Examiner* — Robert W Horn
(74) *Attorney, Agent, or Firm* — John Janeway

(57) ABSTRACT

A method for visually expressing music includes marking a region of a stave to identify a musical note's pitch, wherein the stave includes four lines each of which is parallel or substantially parallel to the other three lines, and each of which defines at least three regional positions where a mark can be made to identify a musical note's pitch, wherein the stave includes at least twelve regional positions and each of the at least twelve regional positions corresponds to a unique pitch of a musical note within a musical octave. The method also includes marking the region of the stave to also identify the duration of the musical note. With at least twelve regional positions defined by the stave, each of the 12 pitches in an octave can have a position within the stave that uniquely identifies the pitch of the note. Furthermore, the stave can span exactly the twelve pitches in an octave to allow one to quickly identify the pitch of the note being visually expressed without having to memorize each position and its associated pitch in the stave. In addition, each pitch in an octave can be identified by numbers (1-N). Western music using 12 notes would have the following 12 Arabic numerals, 1, 2, 3, 4, 5, 6, 7, 8, 9, 10, 11, 12.

18 Claims, 7 Drawing Sheets

U.S. PATENT DOCUMENTS

| | | | | |
|---|---|---|---|---|
| 7,241,945 B1* | 7/2007 | Egan | | 84/483.2 |
| 7,253,349 B1* | 8/2007 | Saltsman | | 84/424 |
| 7,439,438 B2* | 10/2008 | Hao | | 84/483.2 |
| 7,674,965 B2* | 3/2010 | Mataele | | 84/483.2 |
| 7,763,790 B2* | 7/2010 | Robledo | | 84/483.2 |
| 7,767,895 B2* | 8/2010 | Johnston | | 84/483.2 |
| 2004/0007118 A1* | 1/2004 | Holcombe | | 84/483.2 |
| 2004/0139843 A1* | 7/2004 | Forster | | 84/483.2 |
| 2008/0307947 A1* | 12/2008 | Bakke | | 84/483.2 |
| 2010/0180752 A1* | 7/2010 | MacCoy | | 84/483.2 |

OTHER PUBLICATIONS

Karl W. Gehrkens in "Music Notation and Terminology" (The A. S. Barnes Co., NY) 1914, title pages, pp. 5-12.*

Read, Gardner; Proposed Music Notation Reforms; Published 1987; 474 pages; Greenwood Press; New York, NY.

\* cited by examiner

FIG. 7 Alphabet Song

FIG. 8
Beat Unit Comparison
Comparing Current Music Notation to NN Beats Per Measure Timing
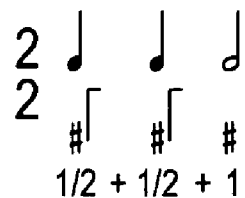
1/2 + 1/2 + 1
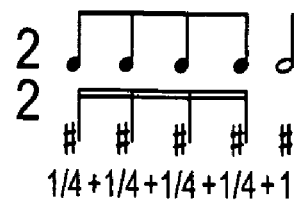
1/4 +1/4 +1/4 +1/4 +1
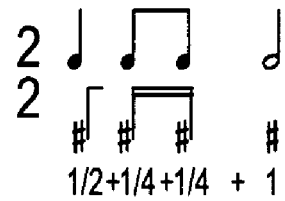
1/2+1/4+1/4 + 1
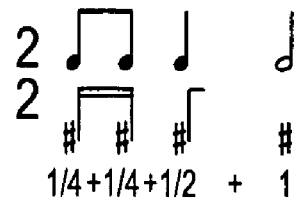
1/4 +1/4+1/2 + 1
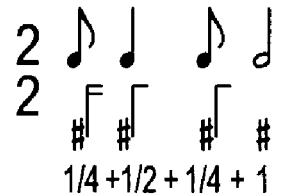
1/4 +1/2 + 1/4 + 1
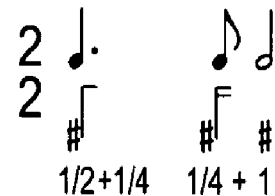
1/2+1/4   1/4 + 1
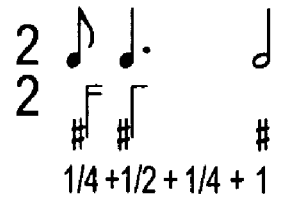
1/4 +1/2 + 1/4 + 1
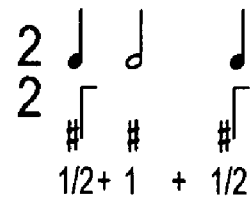
1/2+ 1 + 1/2
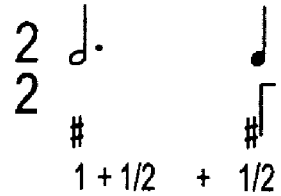
1 + 1/2 + 1/2
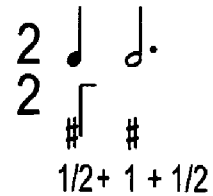
1/2+ 1 + 1/2

FIG. 9
Eighth and Sixteenth note comparison
*Number symbol (#) used in place of pitch number 1-12 for C.P.M examples
In C.P.M the fractionalized values or single note durations equal 2.

2 C.P.M = 1/2 + 1/2 + 1

2 C.P.M = 1/2+1/2+1/2+1/2+1

2 C.P.M = 1/2+1/4 +1/4 + 1

2 C.P.M = 1/4+1/4+1/2 + 1

2 C.P.M = 1/4 +1/2 + 1/4 + 1

2 C.P.M = 1/2+1/4 + 1/4 + 1

2 C.P.M = 1/4 +1/2 + 1/4 + 1

2 C.P.M = 1/2+ 1 + 1/2

2 C.P.M = 1 + 1/2 + 1/2

2 C.P.M = 1/2+ 1 + 1/2

FIG. 10
Values shorter than a beat comparison
Current Music Notation
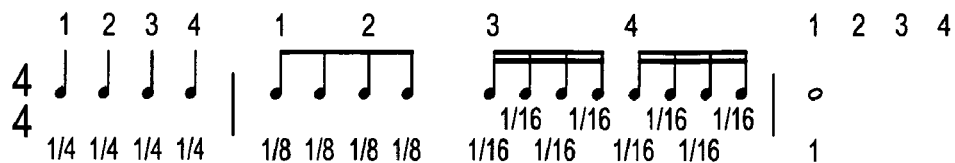
NN... "Counts Per Measure" Timing
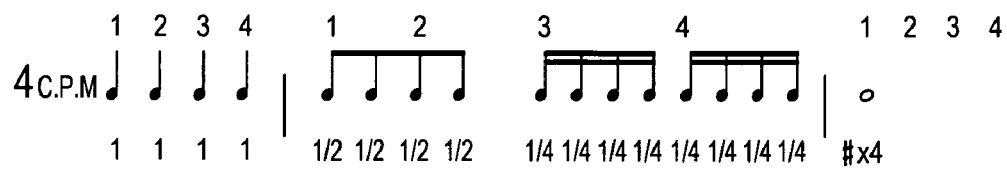
FIG. 11
Notes and Rests Comparison
Current Music Notation
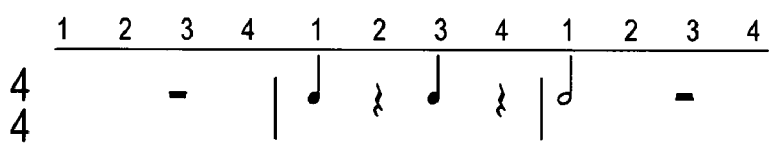
NN... "Counts Per Measure" Timing
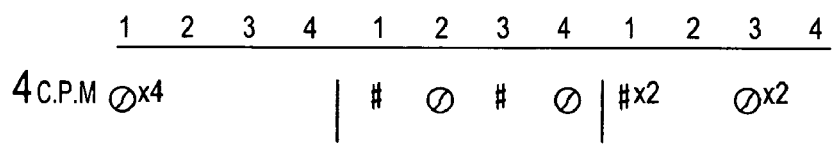

METHODS AND FORMATS FOR VISUALLY EXPRESSING MUSIC

CROSS REFERENCE TO RELATED APPLICATION AND CLAIM OF PRIORITY

This application claims priority from commonly owned, currently pending U.S. Provisional Patent Application 61/204,301, filed 5 Jan. 2009, and titled "Numbered Notes", which is incorporated by reference.

BACKGROUND

Music is a collection musical notes arranged by a composer to convey information and/or emotion to another person— one listening to the music. Each musical note is identified within the music by three pieces of information, the note's pitch, duration, and timing relative to the other musical notes within the music. A note's pitch is the frequency of the sound that one hears; not the unique sound itself. A piano and a trumpet can each generate a sound having the same frequency (pitch) but the sounds generated will not be perceived by a listener as the same. The sounds will not be perceived as the same because one sound is generated from a vibrating string (the piano), and the other sound is generated from a vibrating lip (the trumpet). A note's duration is the length of time that the sound exists. And, a note's timing is the temporal location within the music, i.e. when the sound is generated relative to when the sounds of the other notes in the music are generated.

Because music is a collection of notes that are heard by a listener, music is ephemeral—after the music is heard it's gone. To make music more permanent, and thus allow one to hear the music at a later date, such as centuries after the music was first composed, music is recorded on a more permanent medium. For many, many years the only medium available was a medium on which music was visually, not aurally, expressed, such as paper. Thus, a system or format for visually expressing music has developed.

Currently, the system or format includes a grand stave on which ovals and other marks are drawn to provide the three pieces of information that identify a musical note within music. An example of the current system or format for visually expressing music can be found in FIG. 1, which shows a well-known musical piece—Twinkle, Twinkle Little Star 10 and some additional visual expressions 12 for music. The conventional format shown includes a grand stave 14 which has two five-line staves 16 and 18, connected to each other, one for the treble clef 20, and the other for the bass clef 22. The conventional format also shows notes 24 (48 shown but only five labeled with a reference number for clarity) as ovals 25 (only two labeled for clarity), and rests 26 as a variety of marks. The vertical position of the each oval 25 in each stave 16 and 18 determines the pitch of the note 24, the horizontal position of each oval 25 in each stave 16 and 18 identifies when the note 24 is played relative to other notes 24, and a variety of marks 27 identify the duration of the note 24. Moreover, the current system or format groups musical notes into octaves, and includes seven different names (A, B, C, D, E, F and G) for twelve different pitches within the octave. FIG. 2 is a plan view of a portion of a piano's keyboard 28 and shows 3 octaves of notes 24 (FIG. 1) each of which is labeled with one of the seven letters.

This current system is a legacy from a period in time when the octave only had 7 notes (A-G) and 7 positions on the stave. Each note had its own name and position on or between each line. It was a logical design for 7 notes. The additional 5 notes where added later in history to accommodate more sophisticated harmonies but the system was not redesigned, thus giving us a stave and naming convention that was designed for 7 notes but tasked to handle 12 notes. Instead of renaming the notes and redesigning the stave, sharp and flat accidental symbols were used to augment the system. Thus leaving us with our current music notation system that uses 7 letter names with 7 positions to name and place 12 notes.

Unfortunately, the current system or format for visually expressing music can be very confusing, and thus learning to play and understand music can be more difficult than it really is. As shown in FIG. 1, an octave 30 of pitches spans a portion of each stave 16 and 18, not the whole stave. In other words, each of the staves 16 and 18 spans more than one octave but less than two octaves. Thus, for each pitch one has to memorize the location of the oval 25 in the stave 16 or 18 that identifies the pitch, and the location of the oval 25 that identifies the pitch's octave. In addition, within an octave 30 there are only seven specific positions in each stave 16 and 18 to identify one of twelve pitches in the octave. As sown in FIG. 1, four of the positions are located on the lines of each stave 16 and 18, and three of the positions are located in the spaces between the four lines. To identify the remaining five pitches a sharp accidental (#) or a flat accidental (b) is used in conjunction with one of the seven pitches. As show in FIG. 2, the piano key 32, when struck, makes a sound whose pitch is between C and D (the keys 34 and 36). This note is shown on the five-line stave 18 of FIG. 1 as the note 38 that includes a sharp (#) adjacent the oval, but could also be shown as the note 40 that includes a flat (b) adjacent the oval. Thus, each of the remaining five pitches within an octave (the black keys 32 and 42 in FIG. 2) can be identified by either placing a sharp (#) adjacent the pitch that is immediately lower than itself, or a flat (b) adjacent the pitch that is immediately higher than itself. Consequently, trying to read the music visually expressed in FIG. 1 to play it on the keyboard 28 in FIG. 2 (or any other musical instrument) can be very difficult and take much time and effort to do quickly and accurately.

In addition, to identify a note's pitch that is not identified by any of the positions in each of the staves 16 and 18 of the grand stave 14, one adds lines and spaces either above or below the five-line stave 16 or 18 to establish the position that correctly identifies the note's pitch. That is, each stave 16 and 18 includes positions for identifying a note's pitch within a previously established range of notes, and to identify a note's pitch that is not within the established range, one needs to add lines and spaces to the stave to establish the correct pitch-identifying position. This can be confusing if a piece of music includes notes from more than three octaves.

Also, the first position 41 in the bass clef's stave 18 identifies the pitch for the note A, and the first position 43 in the treble clef's stave 16 identifies the pitch for the note E. Because pitch-identifying positions for each stave are different when compared to each other, one must learn the pitch-identifying positions for both staves 16 and 18. This requires additional time and effort to learn, and can cause frequent mistakes in the note's pitch when reading the music.

In addition, the different marks 27 used with the ovals 25 to identify the duration of a note's pitch, or the duration of a rest 26, are not sequenced logically. For example, a whole note 27a is a hollow oval that does not include a staff 44; a half note 27b is a hollow oval that does include a staff 44; a quarter note 27c is a solid oval that includes a staff 44; and an eighth note 27d is a solid oval that includes a staff 44 and a flag 46. Similarly, a whole rest is a sold rectangle hanging from a line of a five-line stave; a half rest is a sold rectangle resting on a line of a five-line stave; a quarter rest is squiggle line; and an eighth rest is a staff with a flag. Because there is no logical pattern in the markings of the notes that identify duration, and no logical pattern in the markings of the rests that identify duration, one must simply memorize each of the markings and their associated duration.

SUMMARY

In one aspect of the invention, a method for visually expressing music includes marking a region of a stave to identify a musical note's pitch, wherein the stave includes four lines each of which is parallel or substantially parallel to the other three lines, and each of which defines at least three regional positions where a mark can be made to identify a musical note's pitch, wherein the stave includes at least twelve regional positions and each of the at least twelve regional positions corresponds to a unique pitch of a musical note within a musical octave. The method also includes marking the region of the stave to also identify the duration of the musical note.

Because the stave includes four lines, each of which defines at least three regional positions where a mark can be made to identify a musical note's pitch, the stave includes at least 12 regional positions. With at least twelve regional positions defined by the stave, each of the 12 pitches in an octave can have a position within the stave that uniquely identifies the pitch of a note. Furthermore, the stave can span exactly the twelve pitches in an octave to allow one to quickly identify the pitch of the note being visually expressed without having to memorize each position and its associated pitch in the stave. In addition, the stave for the treble clef and the stave for the bass clef can be consistent in the regional positions associated with each respective note with the only exception being a difference in the octave shown.

BRIEF DESCRIPTION OF THE FIGURES

FIGS. 8-11 show comparisons of conventional visual expressions related to measures and beats within a measure, to a format for visually expressing measures and beats within a measure, according to an embodiment of the invention.

DETAILED DESCRIPTION

Figure 3:
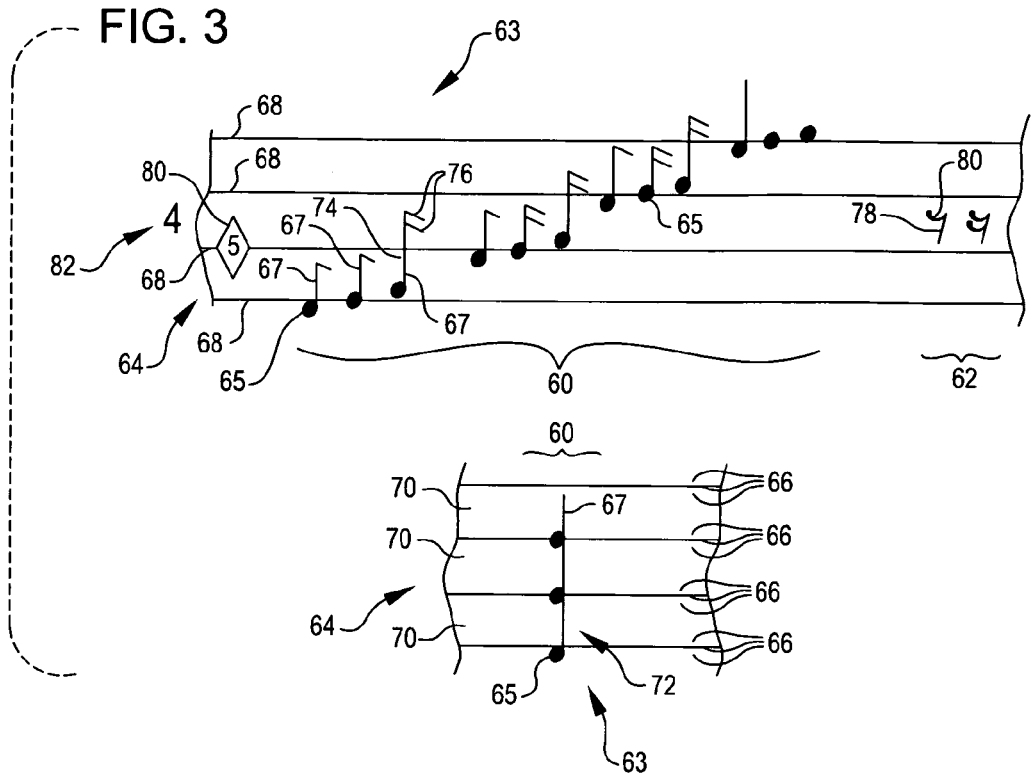
FIG. 3 is a view of musical notes and rests visually expressed in a format that includes a stave, according to an embodiment of the invention.

FIG. 3 is a view of musical notes 60 and rests 62 visually expressed in a format 63 that includes a stave 64, according to an embodiment of the invention. The stave 64 includes a unique regional position 66 for each respective pitch in a group of notes. In western music, the group is the eight-note octave that includes 12 different pitches. To provide a unique regional position 66 for each respective pitch in the octave, the stave 64 may include at least four lines. In other types/ styles of music, the group of notes might have 16 notes, and include 16 pitches. In such a case, the stave 64 would include a unique regional position for each of the 16 respective pitches in the group. The format 63 also includes a mark 65 (fifteen shown but only three labeled with a reference number for clarity) that identifies the specific pitch of a note by the mark's regional position in the stave 64, and another mark 67 (eleven shown but only four labeled with a reference number for clarity) that identifies the duration of the pitch to be generated.

Figure 1:
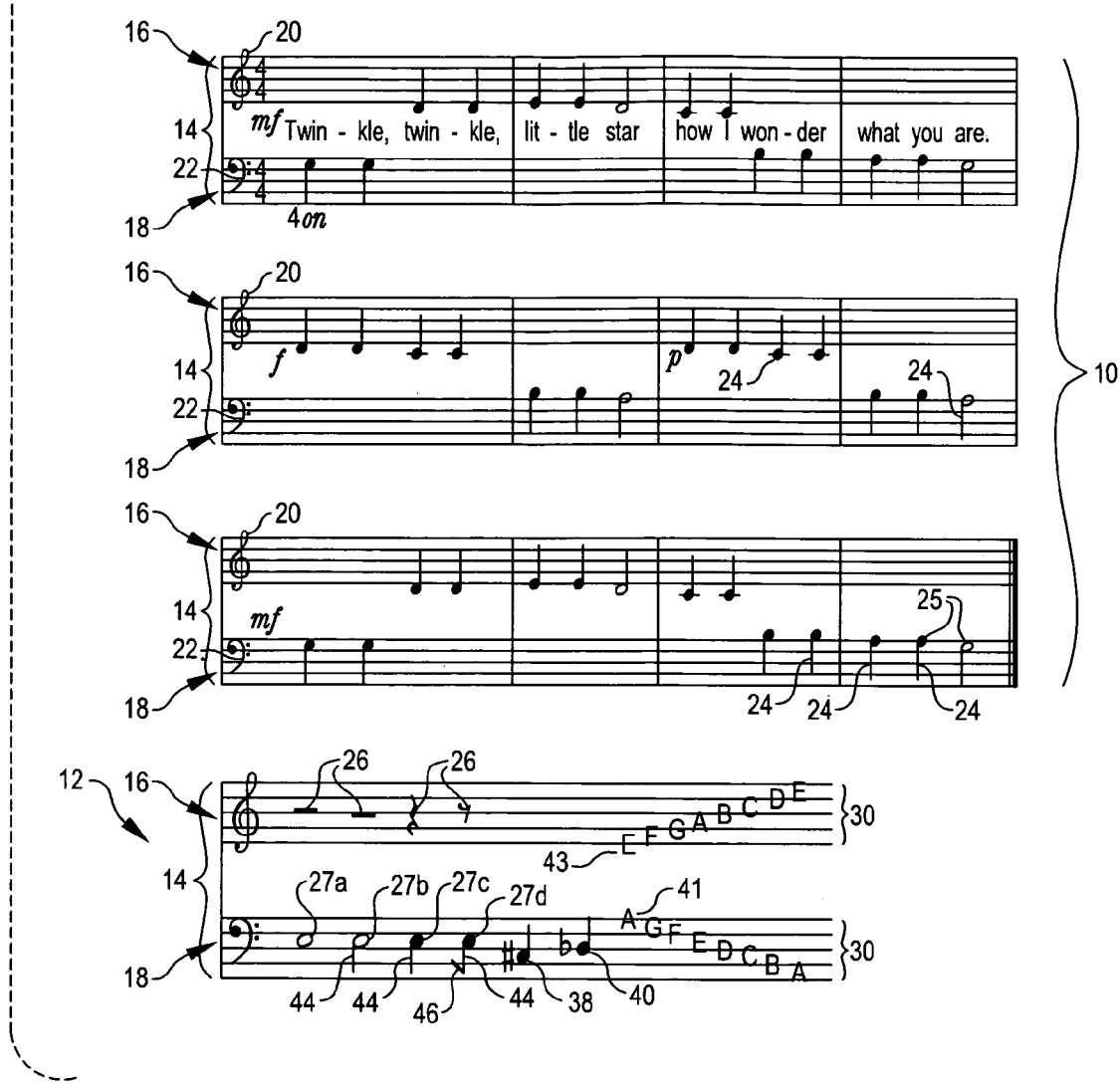
FIG. 1 is a view of a piece music visually expressed in a conventional format that includes a five-line stave.

Because the stave 64 includes a unique regional position 66 for each respective pitch in a group of notes, each pitch in the group of notes can be identified by a mark located in the unique regional position associated with the pitch. One no longer has to identify a specific pitch by locating a mark in a position of another pitch that is immediately above or below the specific pitch and then adding a sharp (#) or flat (b) accidental adjacent the mark like one would have to do to identify $C^{\#}$ or $D^{b}$ using the grand stave 14 shown in FIG. 1. Thus, one no longer has to provide a group of one or more sharps (#) and or flats (b) before the first note to provide the key signature of THE music for the person reading and/or playing the music. The key signature is basically an instruction to sharpen (#) or flatten (b) one or more specific notes identified throughout the music, and can be very confusing to a person who has not substantially studied music. In addition, the stave 64 can span exactly the twelve pitches in a group of notes to allow one to quickly identify the pitch of the note being visually expressed without having to memorize each position and its associated pitch in the stave 64. Furthermore, a stave for the treble clef and a stave for the bass clef can be consistent in the regional positions associated with each respective note with the only exception being a difference in the octave shown.

The stave 64 can include any desired number of lines and define any desired number of regional positions 66. For example, in this and certain other embodiments the stave 64 includes four lines 68, each parallel to the others. Each line 68 locates three regional positions 66. One regional position 66 is located immediately above a line 68. Another regional position 66 is intersected by a line 68, i.e. the regional position 66 includes a line 68. And the third regional position 66 is located immediately below a line 68. In this configuration, each space 70 that exists between each of the lines 68 includes two regional positions, each defined by a respective one of the two lines 68 bounding the space. In this manner, the stave 64 includes twelve unique regional positions, each associated with a respective one of the twelve pitches in an octave of notes.

Other embodiments are possible. For example the stave 64 can include 6 lines 68, and six of the unique regional positions associated with a respective one of the twelve pitches can be located on a respective one of the lines 68, and another six of the unique regional positions can be located in a respective one of the spaces 70 between each of the six lines 68. Another example, includes a stave 64 that defines any other number of unique regional positions 66 to correspond with a group of notes that has more than or fewer than 12 pitches in a group of notes.

Still referring to FIG. 3, the mark 65 that identifies a note's pitch can be any desired mark. For example, in this and certain other embodiments the mark 65 includes an oval that is solid, not hollow like the whole note 27a in FIG. 1 or the half note 27b in FIG. 1. Furthermore, identical solid ovals are used in different regional positions to identify the note's pitch that is associated with the respective regional positions. Thus, a person learning to read and/or play music is less likely to be confused by the variety of marks used in the conventional format shown in FIG. 1.

Other embodiments are possible. For example, the mark 65 can include an Arabic numeral, such as 1, 2, 3, 4, 5, 6, 7, 8, 9, 10, 11 and 12 that can be respectively associated with the notes conventionally named C, $C^\#$, D, $D^\#$, E, F, $F^\#$, G, $G^\#$, A, $A^\#$ and B. In such embodiments, because the number also identifies the pitch of the note, the number's regional position in the stave 64 becomes redundant. By using numbers to identify a note's pitch, one can easily determine which notes comprise a chord 72. A chord is simply two or more pitches generated at the same time. Chords are often recited as intervals from a root or how far apart a note is from the root note of the chord. For example, a most common interval is the Perfect $5^{th}$, which is C and G. Using numbers to identify the pitch of the notes in this chord, this chord becomes a 1+7 interval. Thus if you wanted to play the +7 interval of Root 1 you just add 7, and get 8.

Still referring to FIG. 3, the mark 67 that identifies the duration of the pitch to be generated can be any desired mark that follows a logical sequence. For example, in this and certain other embodiments, the mark 67 includes a staff 74 (four shown but only one labeled with a reference number for clarity) that extends vertically from the mark 65 that identifies pitch, and a flag 76 (four shown but only one labeled with a reference number for clarity). The specific duration of the note's pitch is identified by the number of flags 76 extending horizontally from the staff 74. For example, a single flag 76 as shown in two of the notes 60 identifies the duration of each note as a half note. Two flags 76 as shown in one of the notes 60 identify the duration of the note as a quarter note; three flags 76 identify the duration of the note as an eighth note; four flags 76 identify the duration the note as a sixteenth note. A whole note is identified by the absence of a staff 74 and a flag 76.

Figure 7:
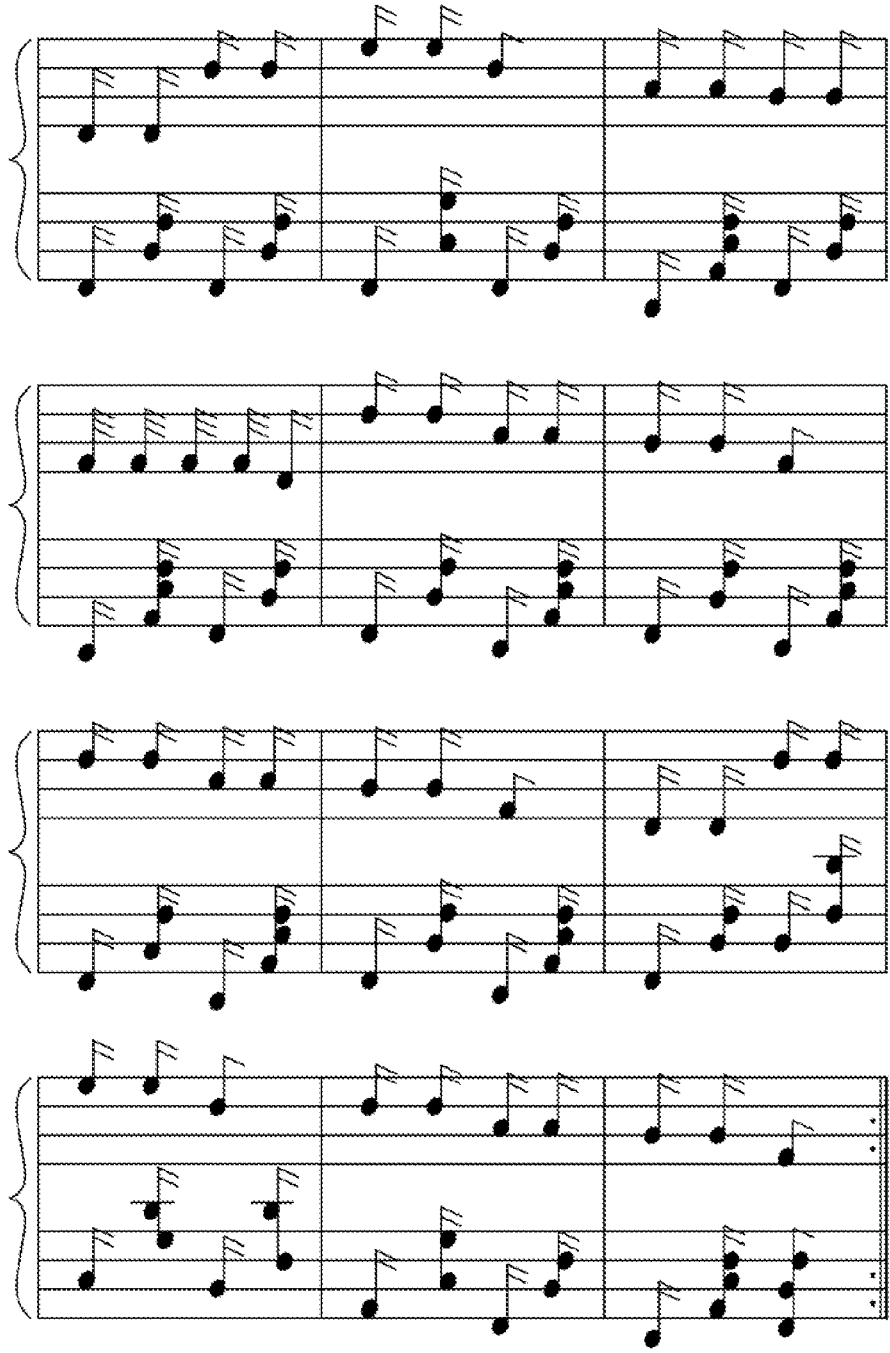
FIG. 7 is a view of another piece of well-known music visually expressed in a format that includes a stave, according to yet another embodiment of the invention.

Other embodiments are possible. For example, the duration of a note's pitch can be identified by adding "×2", "×3" or "×" and the number of counts, which include major and minor beats, within the measure that the note is in next to the mark 65 that identifies the pitch, as shown in FIG. 7. The "×2" can identify the duration of the pitch to be two counts within the measure that the note is in. Similarly, the "×3" can identify the duration of the pitch to be three counts within the measure that the note is in.

Each count in a measure of music is either the one or more major beats within the measure or the one or more minor beats within the same measure, and each measure is assigned a specific number of single notes (see FIGS. 8-11). These single notes can be fractionalized (such as the notes that are marked with the flags 80 discussed in the next paragraph), left single (such as the notes identified by an Arabic numeral), or multiplied (such as the notes that are marked with an "×" followed by a number for the duration in counts of the measure). This allows for a wide variety of duration amounts and expresses the information in a literal manner. For example, in 4/4 time the measure includes 4 counts with each quarter note in the measure receiving a single count. Thus, a half note in the measure would be identified by a "×2" adjacent the mark 65; and a whole note in the measure would be identified by a "×4" placed next to the mark 65. In this manner, unlike the convention format, the measure is not simply fractionalized (½ note, ¼ note, ⅛ note, 1/16 note, and 1/32 note) to provide the correct duration for the notes in the measure but can also be multiplied, such as the half note above being identified by a "×2". Thus, the duration of the note's pitch is more clearly expressed in counts than the conventional format shown in FIG. 1. Still referring to FIG. 3, the rest 62 can be visually expressed using any desired mark. Furthermore, because a rest is the absence of sound, one only needs to identify the existence of the rest and its duration, not a variety of different pitches for the silence. For example, in this and certain other embodiments a rest 62 can be identified by a vertical line 78, and one or more flags 80 horizontally extending from the vertical line. In this example, the rest 62 that includes two flags 80 is a quarter rest. The rest 62 that includes one flag 80 is a half rest. A rest 62 that includes three flags 80 is an eighth rest; a rest that includes four flags 80 is a sixteenth rest; and a rest that does not include a flag 80 is a whole rest.

Other embodiments are possible. For example, a rest 62 can be identified as "ø" and similar to the duration of a note's pitch, the duration of the "ø" rest can be identified by adding "×2", "×3" or "×" and the number of beats within the measure that the rest is in next to the vertical line 78 identifying the existence of a rest. The "×2" can identify the duration of the rest to be two beats within the measure that the rest is in. Similarly, the "×3" can identify the duration of the rest to be three beats within the measure that the rest is in. The rest can also be fractionalized with Binary Flags using the same conventions used for notes.

Still referring to FIG. 3, a mark 82 can be made adjacent the stave 64 to identify the octave that the stave 64 represents. The mark 82 can be any desired number. For example, in this and certain other embodiments, the mark is an Arabic numeral. To identify the middle octave or the octave that includes middle C, the number 4 is placed immediately adjacent and left of the stave 64. To identify a single octave lower than the middle octave, the number 3 is placed immediately adjacent and left of the stave 64. To identify a single octave above the middle octave, the number 5 is placed immediately adjacent and left of the stave 64. If the musical piece spans more than one octave, one can either add another stave 64 above or below the first stave to indicate that the octave has increased or decreased, respectively, from the first stave. Or, one can place a number that is associated with a specific octave in the stave 64 at the location where the octave changes to indicate that the octave has changed. In other embodiments, a curved line (see FIGS. 5 and 6) can be used to indicate a change in octaves and a number adjacent and above the curved line can indicate the new octave.

Still referring to FIG. 3, the format 63 can also include a mark 82 that identifies the key note of a piece of music. The key note of a piece of music is the note all of the other notes in the piece relate to, and can be used to develop note scales for the piece music. The mark 82 can be any desired mark. For example, in this and certain other embodiments the mark 82 includes a diamond with an Arabic numeral positioned inside to identify the specific note that is the key note for the piece. In other embodiments, the mark may be another geometric figure that has an Arabic numeral corresponding to the specific note of the key note positioned inside figure.

Figure 4:
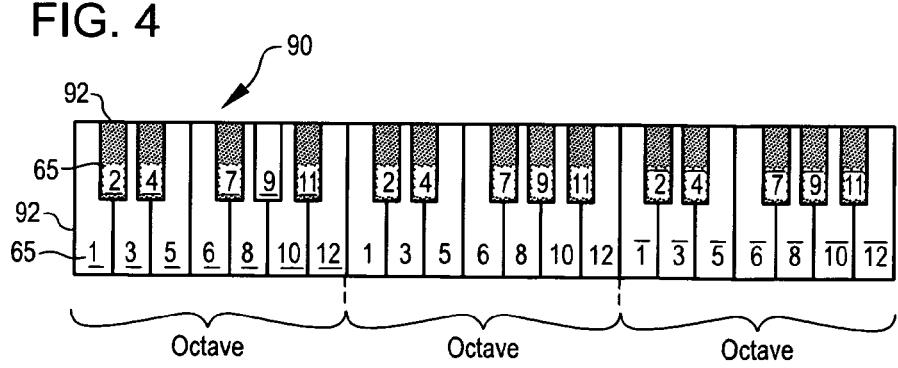
FIG. 4 is a plan view of a portion of a piano's keyboard that shows the piano key that corresponds to a note visually expressed in FIG. 3, according to an embodiment of the invention.

FIG. 4 is a plan view of a portion of a piano's keyboard 90 that shows piano keys 92 (36 shown but only two labeled with reference numbers for clarity) that correspond to respective notes as visually expressed in FIG. 3, according to an embodiment of the invention. In this and certain other embodiments, each note is visually expressed with a mark 65 (36 shown but only two labeled with reference numbers for clarity) that includes an Arabic numeral similar to the Arabic numeral marks discussed in paragraph 24 elsewhere herein. The marks 65 that do not include a horizontal line above or below the Arabic numeral identify notes in the middle octave. The marks 65 that include a horizontal line below the Arabic numeral identify notes in the octave immediately below the middle octave. The marks 65 that include a horizontal line above the Arabic numeral identify notes in the octave immediately above the middle octave.

Figure 2:
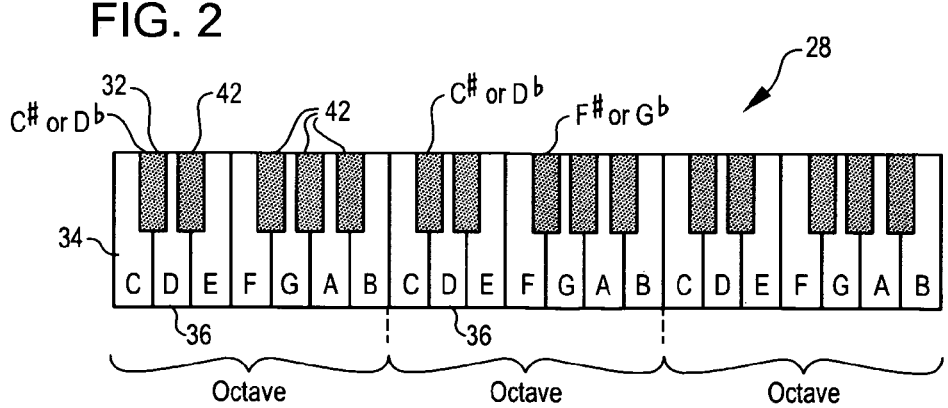
FIG. 2 is a plan view of a portion of a piano's keyboard.

When comparing the piano keyboard 90 in FIG. 4 to the piano keyboard 28 in FIG. 2, it is easy to see that uniquely identifying the black keys, or the five remaining pitches in an eight-note, twelve-pitch octave, can eliminate much confusion when learning to read and play music on a piano. One no longer has two different names for identifying the same pitch made by striking one of the black keys. For example, the note identified as 2 on the keyboard 90 could be identified as $C^\#$ or $D^b$ on the keyboard 28 in FIG. 2.

Figure 5:
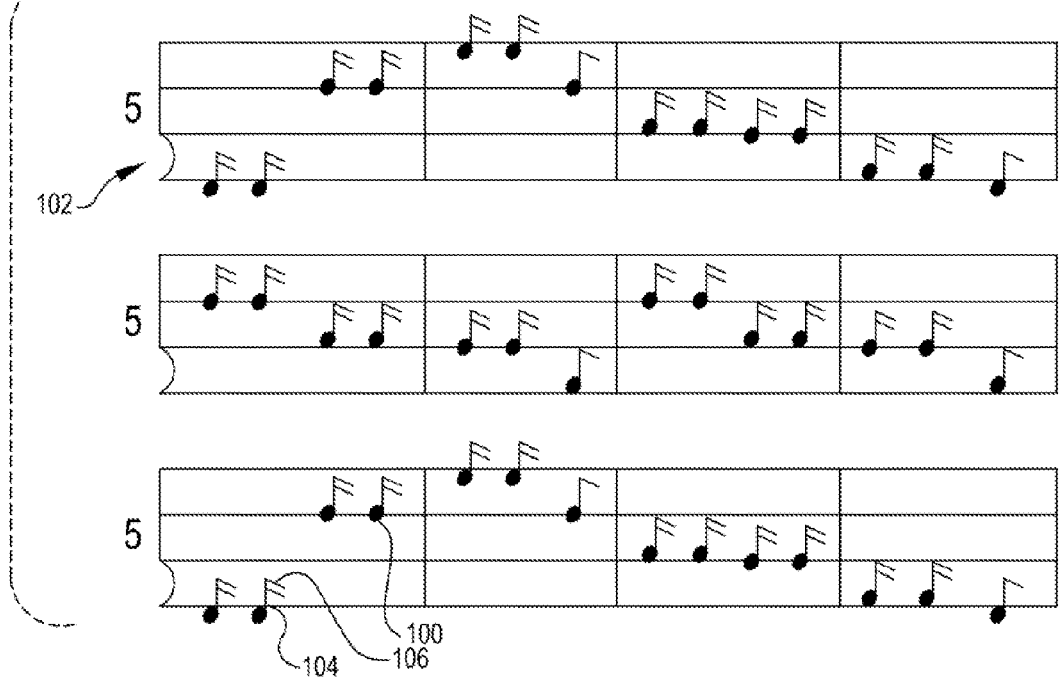
FIG. 5 is a view of a piece of well-known music visually expressed in a format shown in FIG. 3, according to an embodiment of the invention.
Figure 6:
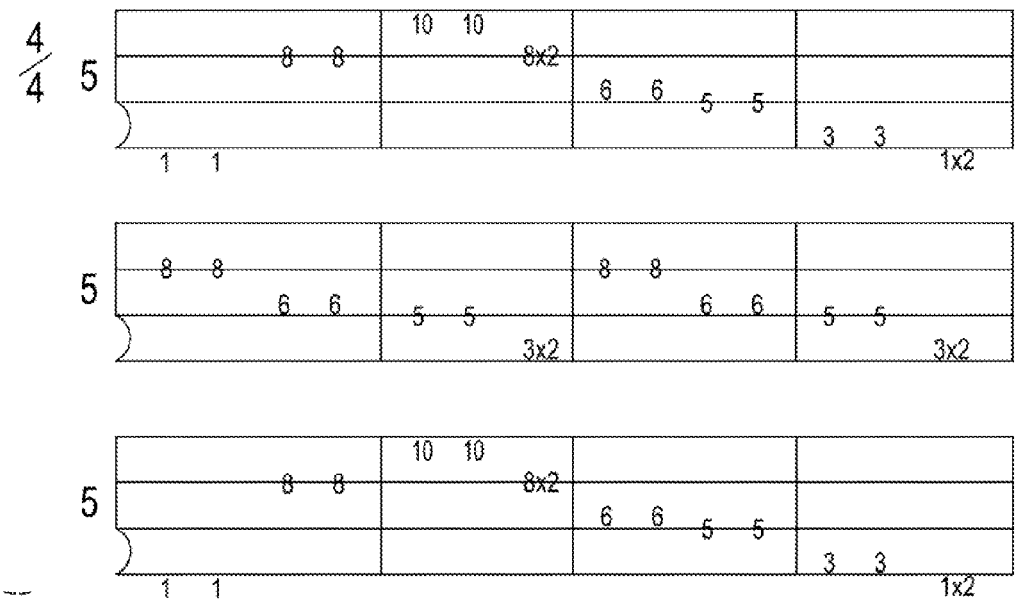
FIG. 6 is a view of the same piece of well-known music visually expressed in a format discussed in conjunction with FIG. 3, according to another embodiment of the invention.

FIG. 5 is a view of a piece of well-known music—Twinkle, Twinkle Little Star—visually expressed in a format shown in FIG. 3, according to an embodiment of the invention. FIG. 6 is a view of the same piece of well-known music—Twinkle, Twinkle Little Star—visually expressed in a format discussed in conjunction with FIG. 3, according to another embodiment of the invention. The format used in FIG. 5 includes a solid oval 100 (42 shown but only one labeled with a reference number for clarity) located in one of 12 unique regional positions within the stave 102 to identify the note's pitch; while the format used in FIG. 6 includes an Arabic numeral to identify the note's pitch. The format used in FIG. 5 also includes a staff 104 and flag 106 (42 shown but only one labeled with a reference number for clarity) to identify the duration of each of the note's pitch, while the format used in FIG. 6 includes a "×2" or "×3" to identify the duration of each of the note's pitch. When compared to the same piece of music—Twinkle, Twinkle Little Star—visually expressed in FIG. 1 in a conventional format, it is easy to see how much clearer and cleaner the formats shown in FIGS. 5 and 6 are relative to the conventional format shown in FIG. 1.

FIG. 7 is a view of another piece of well-known music visually expressed in a format that includes a stave, according to yet another embodiment of the invention. Once again, the format shown in FIG. 7 is very clear and clean, and thus much easier to learn and read than the conventional format shown in FIG. 1.

What is claimed is:

1. A method for visually expressing music, the method comprising:

marking a region of a stave to identify a musical note's pitch, wherein the stave includes four lines each of which is parallel or substantially parallel to the other three lines, and each of which defines at least three regional positions where a mark can be made to identify a musical note's pitch, wherein the stave includes at least twelve regional positions where a mark can be made to identify a musical note's pitch, and each of the at least twelve regional positions corresponds to a unique pitch of a musical note within a musical octave; and marking the region of the stave to also identify the duration of the musical note, wherein;

if the musical note's duration is more than one beat in the musical note's respective measure, then marking the stave's region to identify the musical note's duration includes an Arabic numeral adjacent the mark that identifies the musical note's pitch, and if musical note's duration is less than one beat in the musical note's respective measure, then marking the stave's region to identify the musical note's duration includes:

forming a single flag, extending from the mark that identifies the musical note's pitch, if the musical note is a half note, forming two flags, extending parallel to each other and from the mark that identifies the musical note's pitch, if the musical note is a quarter note, forming three flags, each extending parallel to the others and from the mark that identifies the musical note's pitch, if the musical note is an eighth note, and forming four flags, each extending parallel to the others and from the mark that identifies the musical note's pitch, if the musical note is a sixteenth note.

2. The method of claim 1 wherein marking the region includes forming an oval in the region to identify a musical note's pitch.

3. The method of claim 1 wherein marking a region includes forming an Arabic numeral in the region to identify a musical note's pitch, wherein the Arabic numeral is at least one of the following group of numerals, 1, 2, 3, 4, 5, 6, 7, 8, 9, 10, 11, 12.

4. The method of claim 1 wherein marking a region includes forming an Arabic numeral in the region to identify a musical note's pitch, wherein:

the Arabic numeral is at least one of the following group of numerals, 1, 2, 3, 4, 5, 6, 7, 8, 9, 10, 11 and 12; and each one of the numerals corresponds to a respective one of the following identifiers of a musical note's, pitch C, $C^\#$, D, $D^\#$, E, F, $F^\#$, G, $G^\#$, A, $A^\#$ and B.

5. The method of claim 1 wherein the at least three regional positions of at least one of the four lines included in the stave includes a first position located below the line, a second position located on the line, and a third position located above the line.

6. The method of claim 1 further comprising marking another region of the stave to identify a rest.

7. The method of claim 6 wherein marking the other region includes forming a line to identify the rest.

8. The method of claim 6 wherein marking the other region includes forming a line that intersects at least one of the four parallel lines of the stave, to identify the rest.

9. The method of claim 6 wherein marking the other region to identify the rest includes marking the region to also identify the duration of the rest.

10. The method of claim 6 therein marking the other region to also identify the duration of the rest includes extending at least one flag from the mark that identifies the rest.

11. The method of claim 6 wherein marking the other region to also identify the duration of the rest includes extending at least one flag from the mark that identifies the rest, wherein the number of flags corresponds to the duration of the rest.

12. The method of claim 11 wherein a single flag corresponds to a half rest's duration, and two flags corresponds to a quarter rest's duration.

13. The method of claim 1 wherein the Arabic numeral is at least one of the following group of numerals, 1, 2, 3, 4, 5, and 6.

14. A format for visually expressing music, the format comprising:

a stave that includes four lines each of which is parallel or substantially parallel to the other three lines, and each of which defines at least three regional positions where a mark can be made to identify a musical note's pitch, wherein the stave includes at least twelve of the regional positions each of which corresponds to a unique pitch of a musical note within a musical octave; and wherein the musical note's pitch is identified by a mark in one of the at least twelve regions of the stave and the duration of the note is identified by another mark, wherein:

if the musical note's duration is more than one beat in the musical note's respective measure, then the mark that identifies the musical note's duration includes an Arabic numeral adjacent the mark that identifies the musical note's pitch, and if the musical note's duration is less than one beat in the musical note's respective measure, then the mark that identifies the musical note's duration includes:

a single flag, extending from the mark that identifies the musical note's pitch, if the musical note is a half note, two flags, extending parallel to each other and from the mark that identifies the musical note's pitch, if the musical note is a quarter note, three flags, each extending parallel to the others and from the mark that identifies the musical note's pitch, if the musical note is an eighth note, and four flags, each extending parallel to the others and from the mark that identifies the musical note's pitch, if the musical note is a sixteenth note.

15. The format of claim 14 visually expressed on a sheet of paper.

16. The format of claim 14 wherein the mark that identifies the musical note's pitch includes at least one Arabic numeral from the following group of Arabic numerals, 1, 2, 3, 4, 5, 6, 7, 8, 9, 10, 11 and 12.

17. The format of claim 14 wherein a rest is identified by another mark in a region of the at least twelve regions of the stave, and the duration of the rest is identified by yet another mark.

18. The format of claim 14 wherein the Arabic numeral is at least one of the following group of numbers, 1, 2, 3, 4, 5, and 6.

* * * * *